United States Patent Office 3,389,136
Patented June 18, 1968

3,389,136
10-(3-DIMETHYLAMINOPROPYL)-3-AZAPHENO-
THIAZINE AND DERIVATIVES THEREOF
Frank H. Clarke, Jr., Armonk, N.Y., assignor to Schering
Corporation, Bloomfield, N.J., a corporation of New
Jersey
No Drawing. Continuation of application Ser. No.
436,668, Mar. 2, 1965, which is a continuation-in-
part of application Ser. No. 160,933, Dec. 20, 1961,
now Patent No. 3,196,076, dated July 20, 1965,
which is a continuation-in-part of application Ser.
No. 847,056, Oct. 19, 1959, now Patent No.
3,118,884, dated Jan. 21, 1964. This application
Apr. 8, 1966, Ser. No. 548,343
3 Claims. (Cl. 260—243)

This application is a continuation of my co-pending application Ser. No. 436,668, filed on Mar. 2, 1965, now abandoned, which in turn is a continuation-in-part of my application Ser. No. 160,933, filed on Dec. 20, 1961, now U.S. Patent No. 3,196,076, granted on July 20, 1965, which in turn was a continuation-in-part of my application Ser. No. 847,056, filed on Oct. 19, 1959, now U.S. Patent 3,118,884, granted on Jan. 21, 1964.

This invention relates to the use of 10-(3-dimethyl-aminopropyl)-3-azaphenothiazine, as the free base and as the non-toxic acid addition salts thereof, as an anti-depressant compound, and to the novel compositions of matter containing such an anti-depressant compound.

10-(3-dimethylaminopropyl)-3-azaphenothiazine is a chemical compound having the structural formula:

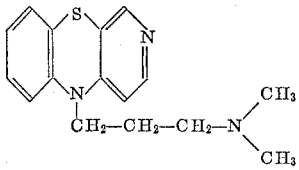

the nomenclature assigned to such a compound being in accord with the system set forth in the Revised Ring Index—RRI 3314.

Specific exemplification for the preparation of 10-(3-dimethylaminopropyl)-3-azaphenothiazine, as well as the preparation of some of the acid addition salts useful for this invention is illustrated as follows:

Example 1.—10-(3-dimethylaminopropyl)-3-azapheno-thiazine-dihydrochloride (A) 2-aminophenyl 3-nitro-4-pyridyl sulfide.—To a stirred, ice cooled solution of 80.0 g. (1.42 moles) of potassium hydroxide in 500 ml. of water was added 100.0 g. (0.80 mole) of o-aminothiaophenol, followed by 650 ml. of dioxane. 4-chloro-3-nitropyridine hydrochloride (122 g., 0.63 mole) was then added and the solution stirred with ice water cooling for 2 hr. Ice water (2 l.) was then added to the reaction mixture and the solid was collected and washed, first with cold dilute aqueous alkali and then with ice water. The crude product (M.P. 134–137°) was recrystallized from about 2 l. of 95% ethanol to give 105.0 g. (68%) of yellow crystals, M.P. 150–151°.

(B) 2-acetamidophenyl 3-nitro-4-pyridyl sulfide.—2-aminophenyl 3-nitro-4-pyridyl sulfide (105 g.) was covered with 300 ml. of acetic anhydride and the mixture heated on the steam bath for 15 min. during which time the solid completely dissolved. The hot solution was poured onto ice and 500 ml. of concentrated aqueous ammonia (28%) added. The yellow solid was collected, dried, and recrystallized from 300 ml. of 95% ethanol to give 110 g. (89%) of product, M.P. 123–124°.

(C) 3-azaphenothiazine.—To a stirred, refluxing solution of 42.5 g. (0.089 mole) of 2-acetamidophenyl 3-nitro-4-pyridyl sulfide in 2.5 l. of acetone under nitrogen was added 14.5 g. (0.26 mole) of powdered potassium hydroxide in small portions over a 30-minute period. The stirring and refluxing under nitrogen were continued for 1 hr. and then the acetone was distilled over 1.5 hr., vacuum being used at the end. Ice water (ca. 1 l.) was added to the residue, the mixture was stirred, and the solid collected, washed well with water, and dried to give 13.8 g. of 3-azaphenothiazine as a light yellow solid, M.P. 243–244° dec. Several recrystallizations from ethanol or acetone raised the melting point to 246–248° dec.

(D) 10 - (3 - dimethylaminopropyl) - 3-azaphenothia-zine.—3-azaphenothiazine (29.2 g., 0.15 mole) and sodium hydride (7.2 g., 0.30 mole) (30 ml. of a 25% suspension in mineral oil) were added to 720 ml. of toluene and 180 ml. of anhydrous dioxane and the mixture refluxed with stirring. After 1 hr., 3-dimethylamino-propyl chloride (18.6 g., 0.15 mole) was added all at once followed by an additional 37.2 g. (0.30 mole) of the halide over a 4-hr. period. The reaction mixture first became green and then turned yellow and finally red as the halide was added. Refluxing and stirring were continued overnight and then the reaction mixture was cooled, excess sodium hydride decomposed with water, and the product extracted into 10% hydrochloric acid. The aqueous solution was made alkaline with ammonia and the product taken up in ether. The ether extract was dried over anhydrous sodium sulfate and distilled, first to remove ether, then under reduced pressure to remove unchanged halide and finally under high vacuum to give 33.5 g. of product as an orange oil, B.P. 200–210°/0.7 mm.; $n^{26}$ 1.6347.

(E) 10-(3-dimethylaminopropyl)-3-azaphenothiazine-dihydrochloride.—10-(3 - dimethylaminopropyl)3 - aza-phenothiazine-dihydrochloride was obtained as yellow crystals upon addition of ethanolic hydrogen chloride to a solution of the base.

Other acid addition salts, such as those formed with such acids as phosphoric acid, sulfuric acid, tartaric acid, citric acid, succinic acid, and the like, may readily be prepared by analogous methods.

While a number of agents have proven useful in the treatment of mental depression in mammals, the need for agents having broader applicability and fewer autonomic and neurological side effects still exists. It is therefore an object of this invention to provide novel compositions of matter that will satisfy such needs. Such an object is accomplished by the compositions of this invention.

Using standard techniques and standard procedures, the toxicity of the compounds of this invention were first evaluated in mice, and then in dogs, with favorable results. Effective anti-depressant activity in mammals may be evidenced by laboratory and clinical techniques wherein a depressed subject's reaction to the compositions of this invention is compared to the subject's reactions to chemical compounds known to have an antidepressant effect. From these tests (tests, for example, such as those found described or referred to in such articles as by D. R. Maxwell, H. T. Palmer, Nature, 191, 84 (1961) and by L. Stein, J. Seifter, Science, 134, 286 (1961) it has been concluded that the compositions of this invention, in their effect upon the central nervous system, cause stimulated effects and altered performance of depressed subjects with few side-effects, and therefore, are useful in the treatment of mental depression in mammals caused by both laboratory-induced conditions and by multifarious modern-day stimuli.

It has also been found that the 10-(3'-methylamino-propyl)-3-azaphenothiazine exhibits a pharmacological profile which is equivalent in potency and in mode of action to that exhibited by 10-(3-dimethylaminopropyl)-3-azaphenothiazine and therefore, for the purposes of this invention, such compounds are considered to be the full equivalents of each other.

The effective dosage of the active ingredient of the compositions of this invention depends upon the severity, the stage, and the individual characteristic of each case and will be determined by the attending diagnostician. Generally, a dosage range of from about 0.1 mg. to about 5 mg. per kg. of body weight per day constitutes the overall range, with a range of from about 1 mg. to 2 mg. per kg. per day for the preferred form of active ingredient.

The compounds of my invention may be used in the form of pharmaceutical preparations which contain the new compound in admixture with a pharmaceutical carrier suitable for enteral or parenteral administration. In their preferred dosage unit forms the active ingredient is present in amounts of about 5 to 150 mg. Such preparations may be in solid forms, as for example tablets and capsules, or in liquid forms, as for example syrups, elixirs, emulsions, and injectables.

In the formulation of pharmaceutical preparations there can be employed such substances which do not react with the compounds, as for example, water, gelatin, lactose, starches, magnesium stearate, talc, vegetable oils, benzyl alcohols, gums, polyalkylene glycols, and petroleum jelly.

The following examples will serve to further exemplify the nature of these various formulations. These examples, however, are not intended and should not be construed in any way so as to limit the scope of the product formulation.

Example 2.—Syrup, 25 mg./teaspoonful

| Ingredient: | Quantity |
|---|---|
| 10 - (3- dimethylaminopropyl)-3-azaphenothiazine dihydrochloride _____gm__ | 5.0 |
| Citric acid _____gm__ | 5.0 |
| Sodium citrate _____gm__ | 1.0 |
| Sodium benzoate _____gm__ | 1.0 |
| Sweet orange peel tincture _____ml__ | 50.0 |
| Sucrose _____gm__ | 800.0 |
| Purified water, q.s. to make 1.0 liter. | |

Dissolve successively the 10-(3-dimethylaminopropyl)-3-azaphenothiazine dihydrochloride, citric acid, sodium citrate, sodium benzoate and sucrose in sufficient water to make approximately 900 ml. Add the sweet orange peel tincture and sufficient water to make the product measure one liter. Agitate until uniform. Filter, using an appropriate filter aid if necessary, until the product is clear.

Example 3.—Injectable, 10 mg./ml.

| Ingredient: | Quantity, gm. |
|---|---|
| 10 - (3 - dimethylaminopropyl)-3-azaphenothiazine dihydrochloride _____ | 10.0 |
| Sodium chloride, U.S.P. _____ | 9.0 |
| Methyl paraben _____ | 1.8 |
| Propyl paraben _____ | 0.2 |
| Benzyl alcohol, R.G. _____ | 9.0 |
| Water for injection, q.s. to make 1.0 liter. | |

Dissolve methyl and propyl parabens in the benzyl alcohol with the aid of heat and agitation. Add this solution to a volume of water for injection equal to 90% of the desired final volume and dissolve with agitation. Add and dissolve the sodium chloride. Add and dissolve the 10-(3-dimethylaminopropyl) - 3 - azaphenothiazine dihydrochloride. Add water for injection q.s. to final volume. Filter aseptically through appropriate sterile filter. Fill aseptically into 10 ml. rubber stoppered vials.

Example 4.—Tablets, 25 mg.

| Ingredient: | Quantity, gm. |
|---|---|
| 10 - (3-dimethylaminopropyl)-3-azaphenothiazine dihydrochloride _____ | 250.0 |
| Lactose _____ | 1000.0 |
| Corn starch _____ | 600.0 |
| Corn starch as 10% paste _____ | 50.0 |

Mix the 10-(3-dimethylaminopropyl) - 3 - azaphenothiazine dihydrochlorides, lactose and corn starch, and pass through a pulverizing mill if necessary. Granulate the mix with the starch paste and add additional water if necessary to make a damp granulation. Pass the granulation through an impact mill to produce 8–12 mesh granules. Spread the granulation on trays and dry in a draft-oven at 35–40° C. Reduce the dried granulation to 16–24 mesh. Blend the foregoing 1900 grams of "wet" granulation with 80.0 gm. of cornstarch and 20.0 g. of magnesium stearate until a uniform mixture is obtained. Compress to 200 mg. tablets on 5/16 inch round punches.

I claim:

1. A compound selected from the group consisting 10-(3 - dimethylaminopropyl)-3-azaphenothiazine having the structural formula:

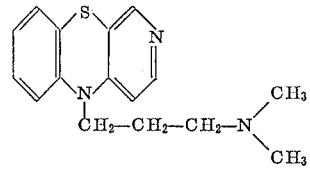

and a non-toxic acid addition salt thereof.

2. A compound of claim 1 having the structural formula:

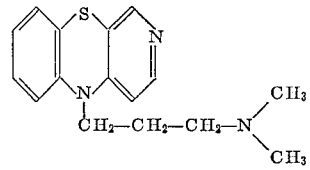

said compound being 10 - (3 - dimethylaminopropyl)-3-azaphenothiazine.

3. A compound of claim 1 having the structural formula:

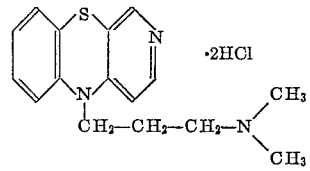

said compound being 10 - (3 - dimethylaminopropyl)-3-azaphenothiazine dihydrochloride.

References Cited

FOREIGN PATENTS 797,061   6/1958   England.

JOHN D. RANDOLPH, *Primary Examiner.*

WALTER A. MODANCE, *Examiner.*

H. I. MOATZ, *Assistant Examiner.*